United States Patent [19]

Cotter

[11] 4,126,049
[45] Nov. 21, 1978

[54] SYSTEM AND METHOD OF MEASURING FLUID PRESSURE FORCE

[76] Inventor: Mitchell A. Cotter, 4555 Henry Hudson Pkwy., Bronx, N.Y. 10471

[21] Appl. No.: 768,362

[22] Filed: Feb. 14, 1977

[51] Int. Cl.² .............................................. G01L 9/00
[52] U.S. Cl. ........................................ 73/702; 73/723
[58] Field of Search ........... 73/398 R, 88.5 SD, 32 A, 73/71.5 US, 702, 703, 723

[56] References Cited

U.S. PATENT DOCUMENTS

| 2,745,278 | 5/1956 | Roberts et al. | 73/398 R |
| 3,198,013 | 8/1965 | Erdely | 73/398 R |
| 3,355,949 | 12/1967 | Elwood et al. | 73/398 R |
| 3,555,880 | 1/1971 | Menius, Jr. et al. | 73/32 A |

Primary Examiner—Donald O. Woodiel
Attorney, Agent, or Firm—Lackenbach, Lilling & Siegel

[57] ABSTRACT

A system and method is described for measuring fluid pressure force by immersing a solid mechanically resonant element into the pressure-bearing medium, exciting the solid mechanically resonant element to resonance, and observing changes in frequency with changes in fluid pressure. The advantage of the disclosed method lies in the high accuracy and resolution that the system permits when it employs for the solid mechanically resonant element a nearly perfect single crystal material since the method relies upon the bulk properties of the resonant material rather than upon other factors.

20 Claims, 8 Drawing Figures

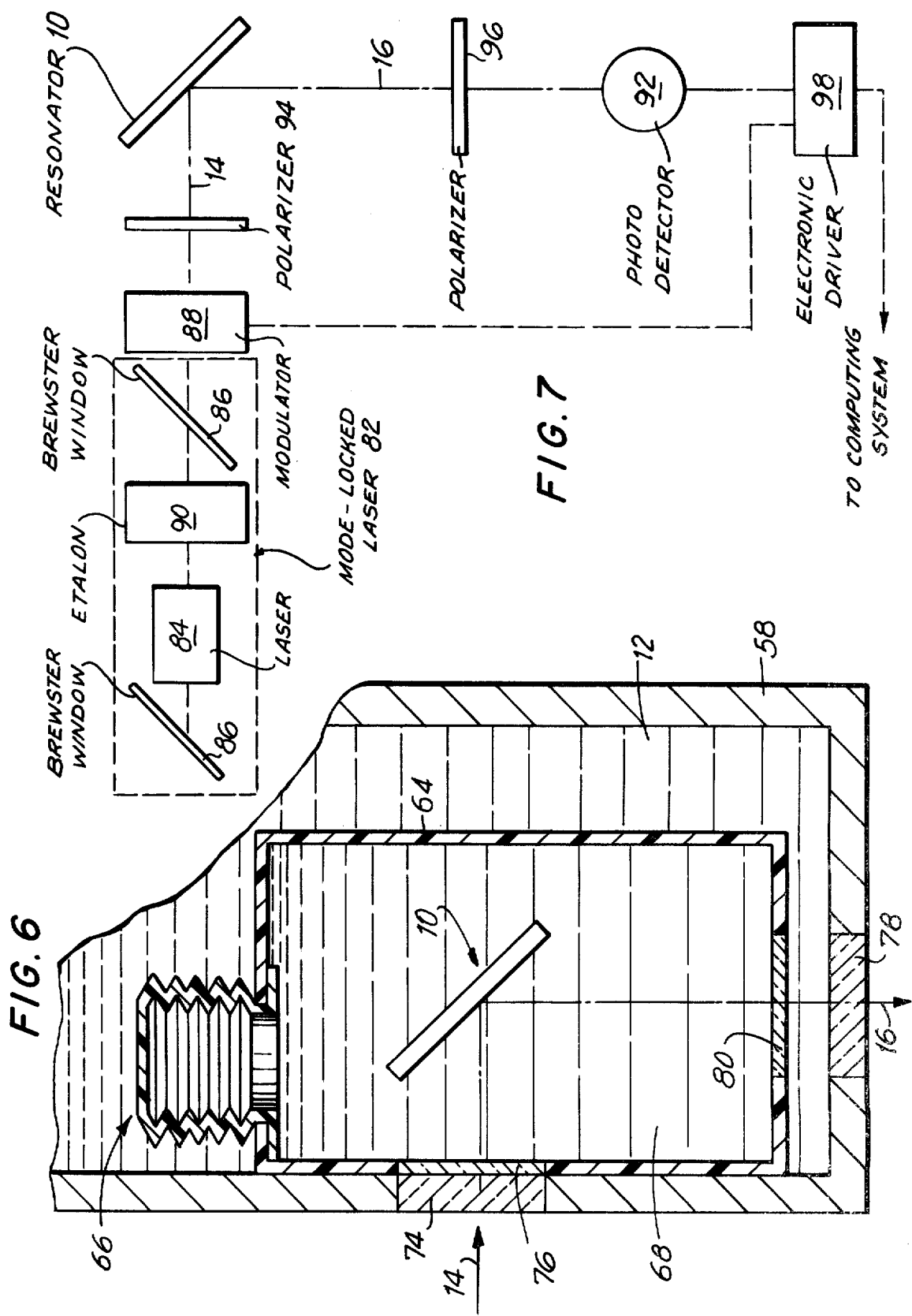

SYSTEM AND METHOD OF MEASURING FLUID PRESSURE FORCE

BACKGROUND OF THE INVENTION

1. Field of the Invention

The present invention generally relates to transducers for measuring fluid pressure forces, and more specifically such transducers which employ resonant elements to sense the force.

2. General Background Considerations

In force measuring methods, including fluid pressure force measurements, systems generally depend upon precise mechanical fabrication of either the entire system of mechanical ratio arms of a mass balance or force beam balance, or alternatively upon precise spring or compliant elements. In the balance schemes, knife edges and jewel bearings and gears are often used in accurate systems. All suffer from the need for precise mechanical parts which tend to wear, age from mechanical stress and suffer further from the finite size limits of the smallest increment of force that can be reliably measured. For even moderately accurate requirements of perhaps somewhat better than one percent, devices that cope with these factors cannot at present be made inexpensively. The complexity and precision of mechanical parts for systems of better than one part in a thousand accuracy become very costly. For very accurate weighings, for instance, as used in laboratory chemical measurements, the methods used usually employ a mass balance scheme. The use of the balance method allows the weighing masses to be transported easily to another location allowing precise calibration against other accurate standards. The local values of gravitational force do not therefore affect the measurement. One makes a ratio measurement by means of a precise mechanically stable beam of known ratio. For accurate work, however, the weights must be handled very carefully so as not to wear or remove any material and must be kept scrupulously clean and free of surface adsorbed vapors or corrosion products. For very accurate weight measurements in laboratory work, the local value of temperature and barometric pressure will affect the buoyancy of the weights in the air and the bending and distortion of the beam by the forces involved all must be taken into account.

In the spring or compliance element systems, one relies upon the stability of the elasticity of a material used to fabricate a spring or diaphragm element and suffers equally from the need for very accurate dimensional and shape fabrication. The compliance or elasticity of the materials employed depend upon use history, work-hardening, environmental exposure, corrosion and creep under steady load. All materials of this type show some deformation or creep, especially if a large relative strain is employed in order to produce a significant magnitude of response to the force being measured. Additionally, compliant element systems suffer from hysteresis where forces vary rapidly and frequently. Spring or compliant systems suffer additionally from inaccuracies in the measurement of the deformation of the strained or compliant element. Electrical strain gauges are often used to make measurements of the deformation in a compliant system. The use of strain gauge electrical output systems for observing the strain or deformation introduces additional problems associated with the degree of coupling of the strain to the measured effect. A concept in evaluating such measuring schemes has evolved to represent the variation in the measured parameter as a function of the magnitude of the value of the observed quality. In a resistance wire strain gauge, this gauge factor represents the percent change in resistance per percent change in strain. The advantage that resistance wire strain gauges offer is that the gauge factor of many schemes is greater than one in that the resistance varies by a larger magnitude than the degree of strain. Gauge factor in such systems therefore represents a kind of magnification of the basic strain of the compliant element into the coupled parameter measured. The variation in the magnitude of the observed parameter is nonetheless a very small portion of the magnitude of that parameter since strains of acceptable hysteresis or creep rarely can exceed but a small fraction of a percent of the volume or dimension of the compliant element. The yield or permanent set point of most materials is defined by convention as the magnitude of stress that will produce one percent permanent strain. It is inherent therefore that the volume or dimension of the stressed compliant elements cannot be deformed very greatly or large inaccuracies will develop. Springs, diaphragms and such like compliant elements are therefore rarely strained any more than one part in a thousand in order to provide some degree of stability. This makes clear the value and the necessity of high stability in the measurement of the coupled parameter in strain gauge and similar indirect measuring systems. The gauge factor concept may be modified to include the stability factors found in the various kinds of indicator systems. When one examines mass balance schemes, strain gauges, compliant elements and related systems from the standpoint of a merit factor, the relative insensitivity of balance schemes is to a large degree offset by the higher order of accuracy and reproducibility obtained. The strain gauge systems lie in an area below this. It is common that in fluid pressure force systems the calibration of precision systems is made by employing a precision piston and known forces obtained from weights or balance systems. The accuracy and stability of the compliant systems is classically, therefore, well below that of the highest accuracy force measuring systems. In recent years, the integration of a compliant diaphragm element and resistance strain gauge into a monolithic silicon semiconductor system has resulted in diaphragm strain gauge systems of notable sensitivity and potentially improved accuracy. Schemes of this type, however, from the standpoint of overall merit factor appear to be only slightly better than classical strain gauges.

There also exists a number of force transducing sensors that employ resonant element structures in an effort to increase the sensitivity and accuracy of the coupled measured parameter to the force measuring system. All such schemes generally represent a similar integration of the compliant element with a size or shape determined oscillating system in an effort to accurately measure the deformation of the compliant element. All previous schemes suffer from complexities in coupling the strain or force to be measured to the resonating element and although increased resolution is often obtained the stability has not generally been improved substantially. There exists some schemes of force coupling technique that have permitted the most accurate high resolution force measurements to be made using the mechanical resonator as a sensor. These schemes have generally been very costly and their merit factor, though substantially greater than those previously discussed, still lies significantly below the region sought after in the subject disclosure.

Compliant elements are generally fabricated of what are known as polycrystalline materials in contradistinction to single crystal materials. An aspect of the noteworthy advantages of the silicon strain gauge-silicon diaphragm integrated sensors is the utilization of highly perfect single crystal material for both strained diaphragm and resistance sensor element. In recent years it has become possible to fabricate large volumes of highly perfect single crystal substance, thereby enabling the elastic properties of such materials to display extraordinary stability and uniformity due to the vastly lower defect density in the solid structure. Most normal materials, metals, plastics, ceramics and other substances are in nature polycrystalline and rely for their elastic properties upon interparticular cementing and attaching forces, as well as upon the more fundamental interatomic forces of the single crystal substance. Such materials vary greatly from batch to batch and as a product of their fabrication history. A noteworthy aspect of the single crystal substance is the product-to-product uniformity and the homogeneity of the various dispersed regions of a shape fabricated from such substance.

A survey of contemporary limits of force measurements is contained in the National Bureau of Standards Special Publication 343, "Precision Measurement and Fundamental Constants", Proceedings of the International Conference Held at the National Bureau of Standards, Gaithersburg, Maryland, Aug. 3–7, 1970. See, for example, the sections in this work relating to length standards and the velocity of light, electrical standards, faraday constant and atomic masses, Josephson affect and gravitational constants.

The Prior Art

Numerous attempts have been made to measure fluid pressure forces by means of resonant-type force transducers. For example, in U.S. Pat. No. 3,470,400, for "Single Beam Force Transducer With Integral Mounting Isolation", there is provided a quartz crystal resonator supported at opposing ends thereof. With no axial force applied, the natural resonant frequency is determined primarily by the beam geometry and composition. In response to tensile forces, however, this resonant frequency increases and the frequency decreases when the resonator is compressed. In this way, there is made an attempt to relate the resonant frequency to the input force. The force transducer, as well as a subsequent development disclosed in U.S. Pat. No. 3,479,536, for a "Piezoelectric Force Transducer", has several major disadvantages. Firstly, the manufacturing tolerances and fabrication difficulties result in substantial manufacturing costs. Additionally, the devices disclosed in these aforementioned patents require individual calibration and are extremely sensitive to manufacturing tolerances. While the results achieved with these transducers transcends some of the prior art, the results achieved have been at a very high cost and further possible improvements by using the disclosed techniques appear to be limited. Pressure transducers which incorporate the invention disclosed in the aforementioned patents are exemplified in the Paroscientific, Inc. (Redmond, Washington) Data Sheets Nos. 0276 and 0176. The pressure transducers under discussion are also more fully discussed in the following publications: ISA paper presented at Instrument Society of America, 21st International Instrumentation Symposium ASD/TMD, May 1975 at Philadelphia, Pennsylvania, entitled, "Digital Quartz Transducers for Absolute Pressure Measurements" by Jerome M. Paros, President of Paroscientific, Inc.; and "Precision Digital Pressure Transducer", by Jerome M. Paros, published in the ISA Transactions, Volume 12, No. 2, at pages 173–179 (1973).

Another transducer is disclosed in U.S. Pat. No. 3,482,197 for "Pressure Sensitive Device Incorporating Semiconductor Transducer". This patent is concerned principally with obtaining the advantages of higher gauge factor in semiconductor strain gauge systems, without the common attendant disadvantages of poor stability. The merit factor of the disclosed patent is improved by means of the special structure detailed therein. The overall result is still inferior to the merit factor of the previously disclosed piezoelectric resonant force transducers discussed in the Paros articles.

In U.S. Pat. No. 3,745,384, there is disclosed a "Resonant Pressure Sensor" employing a diaphragm responsive to the pressure and resonant in a particular modality such as to permit a larger frequency shift as a function of pressure to occur in such a diaphragm than is common in other embodiments of this general type. The patent thereby seeks to increase its relative gauge factor, but the stability of such systems is still rather limited and the overall results obtained not likely to approach the stability disclosed in the first two patents cited above.

In U.S. Pat. No. 3,878,477, for "Acoustic Surface Wave Oscillator Force-Sensing Devices", there is described an essentially distance sensing device which incorporates a compliant element, namely a substrate which is elastically deformed under a bending force. The frequency of oscillation in such an acoustic surface wave oscillator is a function of the stress to which the substrate is subjected. However, since the substrate must be supported, and is shown in the patent in both a cantilevered and in a diaphragm arrangement, the device inherently reflects all of the limitations of the compliant element upon which it is created. The patent specification suggests the use of single crystal (quartz or lithium niobate) in order to obtain a superior compliant element. While this patent discusses surface wave oscillators wherein the surface of the substrate is placed into resonant mode or oscillates mechanically, the device disclosed does not take advantage of the bulk properties of the substrate, but rather operates in the region of the substrate where it has the greatest imperfection. Accordingly, the stability which is normally associated with the nearly perfect crystalline materials is not incorporated into such an oscillator. It may also be noted that the device of this patent bases its operation on the application of a bending force to the substrate, and this is done because the principle of operation is the measurement of distance. The acoustic surface wave oscillator under discussion could not practically be utilized to measure fluid pressure forces, since immersion of the substrate into a fluid medium would disrupt the oscillations.

The U.S. Pat. No. 3,435,377 for "Force-To-Frequency Transducer" discloses a transducer which produces variations in its output frequency in response to variations of an applied force by loading a sensing element and thereby varying the natural frequency at which it vibrates. The sensing element is described as being made of a high elastic material whose natural frequency of oscillation can be changed by applying tortion or flection forces thereon. This transducer suffers from the numerous disadvantages already discussed above and does not lend itself to accurate, stable measurements.

A "Load Measuring System" is described in U.S. Pat. No. 3,303,694. The device disclosed is a volume equivalent path length measuring device, and, in this sense, is similar to the above-mentioned acoustic surface wave oscillator of U.S. Pat. No. 3,878,477. This device exhibits all of the classical limitations of compliant force transducers, and is intended only to provide a frequency indication of a displacement. There is no suggestion in this patent that nearly perfect crystalline material be used for the compliant element and, therefore, the device described offers no particular advantage over other or comparable devices which utilize other distance sensing means.

The above-discussed prior art, as well as other prior art discussed in the literature, all disclose compliance element limited devices and suffer from the fact that they all base their accuracy and precision on compliance elements which are significantly imperfect. In each case, the compliance elements do not have very high stability or economic simplicity. The most effective of these appears to be the tranducers in U.S. Pats. Nos. 3,470,400 and 3,479,536, which combine the elastic compliant element and the displacement measuring transducer in the quartz crystal material used thereby avoiding the coupling and linking imprecisions, obtaining the greater elastic perfection of the more nearly perfect cyrstalline quartz material for the compliant element, but remaining expensive and limited by the need to supply the force through a mechanical linkage and in a uniaxial fashion.

SUMMARY OF THE INVENTION

Accordingly, it is an object of the present invention to provide a fluid pressure force measuring system which overcomes the foregoing disadvantages of prior art systems.

It is another object of the present invention to provide a fluid pressure force measuring system which is less costly to manufacture while retaining the objective of high accuracy.

It is still another object to provide a fluid pressure force measuring system wherein mechanical forces produce an effect which is inherently dependent upon some fundamental property in nature rather than upon man-made fabricated elements of imperfect character relying upon the minutia and the perfection of process and mechanism and shape and form and many other necessarily expensive details.

It is yet another object of the present invention to provide a fluid pressure force measuring system which is intrinsically far more sensitive, provides far more resolution and accuracy than presently known systems, so that any dilution of the process of the present invention to something more limited still provides the combination of required accuracy and economy.

It is a further object of the present invention to provide a fluid pressure force measuring system which provides a high merit factor at a low cost, depending as it does on the inherently high stability of intermolecular and interatomic forces of materials, and more paticularly, nearly perfect crystalline materials of enormous purity and perfection.

It is still a further object of the present invention to provide a fluid pressure force measuring system of extremely high accuracy and resolution, and which produces a detectable effect in digital form, so that deriving the information directly in digital form assures that the accuracy and resolution of the system is not limited by the detection parameters.

It is an additional object of the present invention to provide a fluid pressure force measuring system which is highly versatile in its environmental requirements and potential range of application, so that the system can be used over a wide range of temperatures, pressures, forces, and which is suitable for making measurements over wide ranges or scale values.

It is still an additional object of the present invention to provide a fluid pressure force measuring system, including the transducer and method associated therewith, which utilizes a solid mechanically resonant element immersed in a pressure bearing medium, and whose relative changes in frequency is primarily dependent on the bulk properties of the solid mechanically resonant element, the method providing extremely high resolution and accuracy, substantially independent of drift effects, and which is substantially less costly than heretofore known systems and transducers whose resolution and accuracy is less than now achievable.

Yet another object of the present invention is to provide a fluid pressure force measuring system which, in a commercial form, can comprise a weighing system capable of performing virtually any weighing function, that is inexpensive to manufacture and yet highly accurate.

It is a further object of the present invention to provide a fluid pressure force measuring system which can easily be translated into such commercial applications as a low-cost, highly accurate bathroom scale. The bathroom scale, if desired, can present a digital read-out.

Present manufacturing techniques make algorithms economically feasible. The present invention, therefore, contemplates the use of a chip programmed by employing algorithms to accomplish all of the intended and potential purposes of the present invention.

It is to be understood that the term "fluid pressure" must be considered to cover any gaseous or liquid or other rheologically comparable medium, for example, gels, semi-solids, and such other states of matter as will generally support, to the extent required to an intended use, the hydrostatic-like distribution of force immersing the solid mechanically resonant element.

In order to achieve the above objects, as well as others which will become apparent hereafter, the present invention is for a fluid pressure force measuring system or transducer which comprises a solid mechanically resonant element immersed in the pressure bearing medium whose frequency is affected by the value of the fluid pressure force. The solid mechanically resonant element is excited, and the resonance condition is detected by suitable means for determining the value of the resonant frequency of the solid mechanically resonant element and for determining the value of the fluid pressure force therefrom. An important feature of the present invention is that the relative change in frequency with changes in fluid pressure force is primarily dependent on the bulk properties of the solid mechanically resonant element.

In accordance with one feature of the invention, detection includes the step of forming a ratio of frequency values corresponding to the differing fluid pressure force conditions.

While the basic approach of the present invention may utilize practically any solid mechanically resonant element, the advantages of the system and method are best realized by utilizing a highly perfect single-crystalline material. However, polycrystalline materials, amorphous glassy materials, and super-cooled fluids in a glassy state, among other, may also be utilized.

The approach described herein makes it possible to couple the excitation and detection means reciprocally through the solid mechanically resonant element, in which case antireciprocal effect coupling means are provided external to the solid mechanically resonant element for sustaining the oscillations thereof. However, the technique of the present invention also admits the possibility for coupling the exciting means and detecting means anti-reciprocally through the solid mechanically resonant element itself for sustaining the oscillations thereof. The latter approach is particularly adaptable for miniaturization, and for providing remote measurement possibilities.

By using a solid mechanically resonant element, preferably of the highly perfect single-crystalline type, whose resonant conditions are inherently dependent upon fundamental properties in nature, rather than upon imperfect man-made fabricated elements, the technique of the present invention offers unparalleled dimensions of accuracy and stability, particularly since the resonance effects are immediately detectable in digital form. The perfection of the method will be a function of the perfection or the purity or refined state of the crystals from which the solid mechanically resonant elements are made. However, since crystals, for example, of pure silicon, can be made to a degree of purity that there are not a thousand dislocations in a volume of cubic inches of material that have $10^{24}$ atom/in$^3$, the present approach can realize enormous accuracies by taking advantage of this property of highly perfect single-crystalline materials.

The present invention also admits elimination of adverse measurement errors, such as the imperfections at the boundaries of the solid mechanically resonant element, by exciting and detecting the resonance conditions interiorly of a solid mechanically resonant element, where, for practical purposes, there are no boundary conditions and the interatomic or intermolecular arrangements from atom to atom, and the lines of force or lattice bonding forces are the same thoughout. Such highly pure materials are presently available at low cost, so that there is no need to utilize more inferior materials. However, the inherent accuracy and resolution of the system is so much greater than what is presently available, that the transducer of the present invention can still offer significant advantages over prior art techniques even where, because of more limited objectives, less purified materials are used.

BRIEF DESCRIPTION OF THE DRAWINGS

Further advantages of the invention will become apparent from a reading of the following specification describing illustrative embodiments of the invention. This specification is to be taken with the accompanying drawings in which:

FIG. 6 is generally similar to FIG. 4, but showing an alternate embodiment, wherein the containers housing the solid mechanically resonant element are provided with transparent windows to permit the resonant element to be excited by optical means, and for permitting optical energy containing the resonance information to be extracted from the containers;

FIG. 7 is a block diagram of an arrangement which may be used in connection with the approach shown in FIG. 6.

DESCRIPTION OF THE INVENTION

Solid Mechanically Resonant Element (SMRE)

Figure 1:
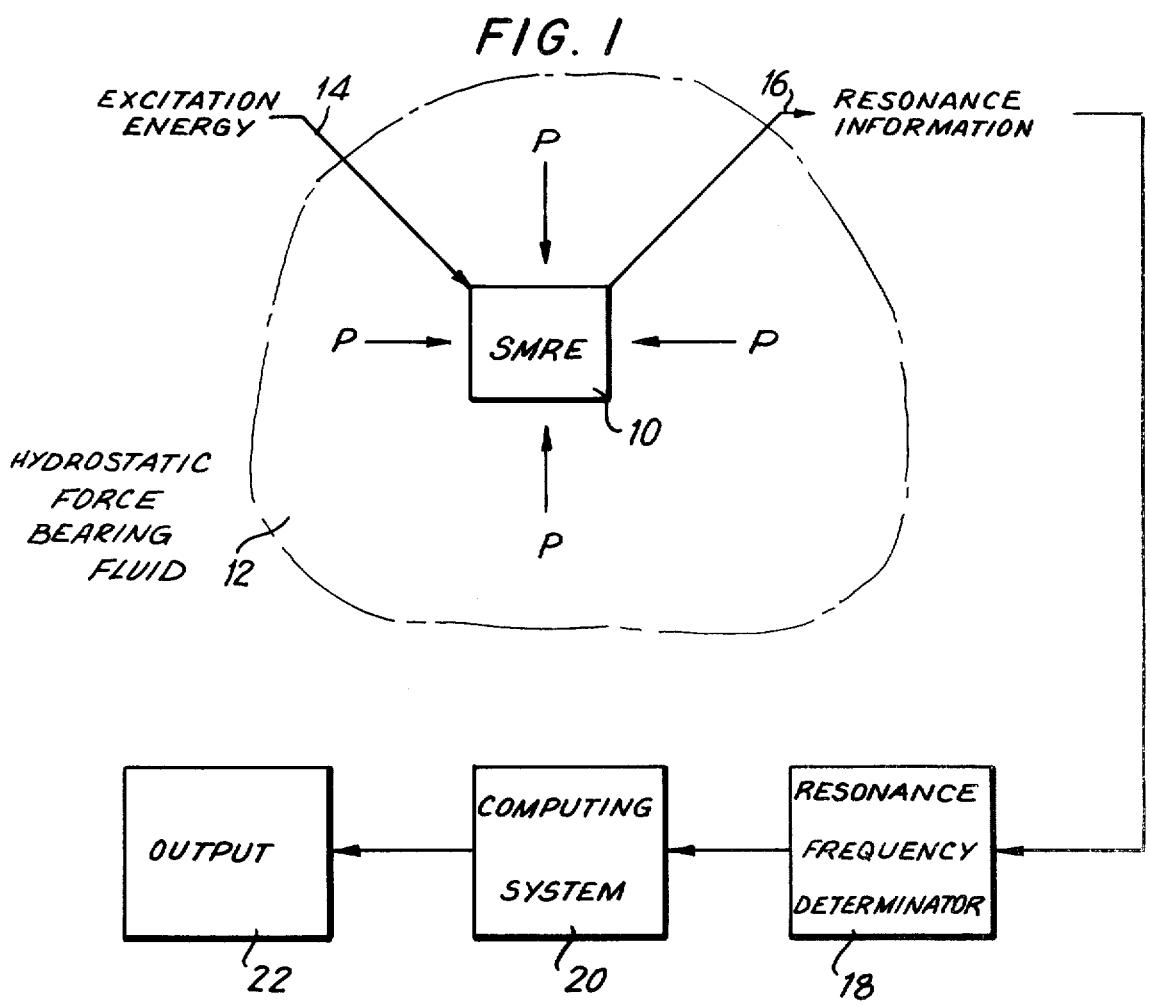
FIG. 1 is a schematic representation of a fluid pressure force measuring system in accordance with the present invention, showing the generalized requirements for feeding exciting energy to a solid mechanically resonant element and extracting resonance information therefrom while it is immersed in a fluid pressure force bearing fluid.
Figure 2:
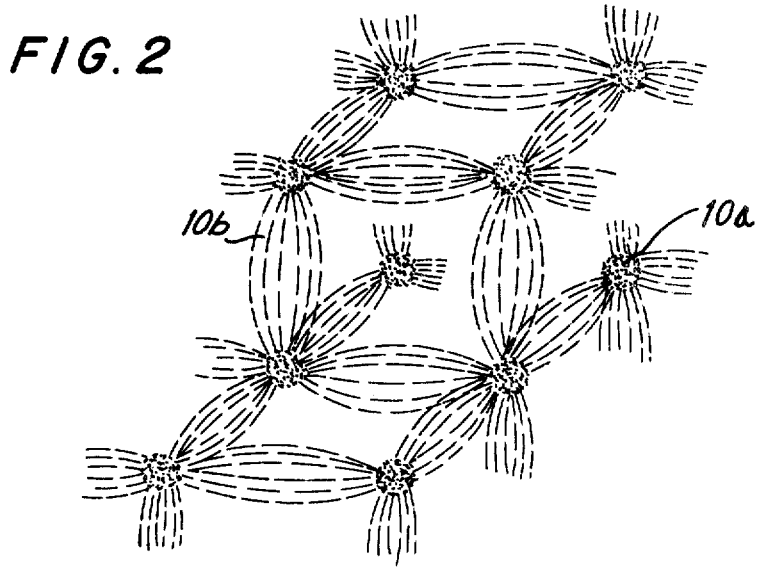
FIG. 2 is a representation of the arrangements of atoms or molecules of the solid mechanically resonant element when the same is made from a highly purified single crystal material.

Referring to FIGS. 1 and 2, the broad or general concept of the present invention is illustrated. The basic or fundamental concept or approach of the present invention is to immerse a solid mechanically resonant element (SMRE) 10 in a fluid medium 12 which bears the fluid pressure force or pressure "P" to be measured. The properties of the SMRE 10 will be more fully described below.

An important feature of the invention is that the mechanically resonant frequency of the SMRE 10 is not critical or even germane to the ultimate output which is to be measured. Nor is the size or shape of the SMRE important. What is important is that the frequency or changes in frequency of the SMRE is a function of the compressive forces or pressure applied by the coupling medium. The arbitrary nature of the SMRE therefore admits of its being constructed of, in an ultimate sense, a perfect single crystal material, even though that may require a small volume.

A perfect crystalline material of a single atomic or molecular species, which has atoms or molecules 10a arranged in an ordered lattice structure, will be dependent solely upon the identical interlattice element forces 10b of the highly perfect or nearly perfect single crystalline substance. In FIG. 2, the lattice arrangement of elements of this kind is shown diagrammatically. Since the structure admits of using a single crystal of ultimate purity for the force to effect conversion, no more accurate compliant element could ever be created in nature. The process of observing its resonant frequency is already a highly developed art wherein accuracies of the order $10^{14}$ or $10^{15}$ are available. This condition would seem to fullfil to a theoretically perfect extent the objectives described above. As will be apparent below, the simplicity of the structure also admits of an extremely low cost. To recapitulate a very basic point, the identity of the compliant element and the sensory or conversion process is an important part of the invention disclosed.

Returning to FIG. 1, it is apparent that the pressure effect on the SMRE 10 is therefore observable as a result of the coupling of the resonance frequency to the force through a property of nature. The property of nature arises fundamentally because manufacturing methods exist wherein it is practical to fabricate a crystal that is completely perfect, atom by atom, molecule by molecule, to the extent necessary to achieve a practical resonator for the purposes described herein. It is, however, not necessary for the purposes of the invention described herein to completely perfect such an element since the ultimate accuracy of such a technique may be far beyond that required and has already been demonstrated to exceed the capability of existing methodology. Nearly perfect crystalline elements or indeed polycrystalline materials operated in this manner will exhibit superior merit factor-cost-accuracy and still possess the property of direct digital conversion. They do all of this while retaining the arbitrary nature of their size, shape, frequency and operating conditions.

Still referring to FIG. 1, the SMRE 10 shown, though of resonant character, necessarily for purposes of observing its resonance, must be excited to a mechanical resonant state by an energetic source 14 of some sort. The effect of that resonance, that is the mechanical vibratory process, may produce any observable process 16 as a consequence. This resonance information or output may be utilized to extract the force measurement. As described below, this output 16 may be used to sustain the oscillation either indirectly through external means or potentially by internal means where the conversion of exciting energy to resonance output effect is of an anti-reciprocal nature. Anti-reciprocal as used herein, refers to the fact that the excitation energy to effect production will not be inverted when the output effect is created by other means so that the flow of energy to effect is unilateral in character. The diagram of FIG. 1 represents all systems, whether reciprocal or anti-reciprocal, in coupling character. The realizations herein disclosed illustrate three Examples in which a reciprocal method and two anti-reciprocal methods are described. These are merely illustrative of embodiments of the apparatus and method disclosed, and are not intended to limit the scope of the present invention. Numerous other excitation and information extraction techniques may be utilized with equal or substantially equal effect, with varying degrees of advantage.

The SMRE 10 is of its nature potentially mechanically resonant. It is the presence of the mechanical resonance that will be used to detect the effect of fluid pressure "P" upon it. Therefore, it must be in a state of mechanical resonance, that is to say there must be some stored energy present in order for this resonance to be effected. Obviously this stored energy has to be larger than the intrinsic thermal, quantum or whatever other noise is present in the device and further, obviously, it must be necessary that some resultant occur in the resonance information output carrying some energy away from the device in order to observe the frequency of this resonance. The precise means for excitation 14 or resonance observation 16 are not material for the purposes of this discussion and many will occur to those skilled in the art applying the invention described herein.

It will also be apparent to those skilled in the art that it would be desirable to avoid any boundary effects whatsoever from the arbitrary form and shape and volume of the SMRE to provide energy trapping modalities within the SMRE that circumvent partly or wholly, a dependence upon the surface geometry of the SMRE 10. Varying schemes exist for implementing this technique and are contemplated by the invention herein described since it represents the ultimate perfection of the invention.

A further method of perfecting the utility of the invention is to compare a force condition "1" with a force condition "2", either in singular measurements or repetitively or in the form of averages, wherein the differences between the two relative states to be measured is represented by the effective division of one frequency by the other forming a ratio of frequencies wherein all the absolute values of the various terms are eliminated and only the pure force effect remains evident. This can be described in an elementary equation of the form $$Output = (f1/f2 - 1) K$$

where $K$ is the desired output coefficient. In the foregoing equation, $f1$ is the larger of the terms $f1$ and $f2$. In order that the minus term be appropriate, inversions of this relationship would require inversion of the summation. Many of the factors of drift in structures of lesser perfection or thermal effects and such errors are eliminated by the taking of the ratio. Furthermore, two devices of identical substance may be constructed of arbitrary shape, size and frequency and by this means produce outputs of identical value. Such an independence of precision has great commercial significance in manufacturing devices embodying the principles described herein. K represents the desired scale factor for the purposes intended and, in fact, in presently contemplatable means employing digital computation in the fashion of common pocket calculators, would be a term inserted subsequent to manufacture so as to represent the function to be performed either by the user, by the factory or optionally at the discretion of the system employed. Present manufacturing techniques make algorithms economically feasible. The present invention, therefore, contemplates the use of a chip programmed by employing algorithms to accomplish all of the intended and potential purposes of the present invention. It can be seen that the precision with which this coefficient may be applied will depend upon establishing the magnitude of the force to be measured by some means or other, possibly independent of the device herein described. It is not unlikely to contemplate that the precision of alternative methods may not exist to the degree of precision present in the invention disclosed and it may be that coefficients will be determined by another system of standarized character embodying the principles herein disclosed. Known methods of establishing force are of limited accuracy below the range where the present system would appear to offer advantage. Absolute standard methods of measuring force at the present time are of limited accuracy in the range of one part in $10^6$. In accordance with the present invention, a force can be measured that will be accurate in a range that is greater than one part in $10^6$ and even, theoretically, accurate to one part in $10^{15}$. Recent developments in utilizing the Josephson junction effects have extended the portent of electrical to force measurement standards by allowing a direct coupling with subatomic physical constants. Namely, the force can be related to the term $(2e/h)$ and a frequency measurement wherein "e" is the charge of the electron and "h" is Planck's constant. Such fundamental constants may or may not provide operational accuracies beyond that potential in a physically defined embodiment of the disclosed invention, but affords a second path of connecting the results of such measurements and defining the precision of the K term mentioned above.

Reference is made in this application to the bulk properties of materials. In general, normal solids are heterogeneous materials, even though they look homogeneous. They are composed of little crystals, little substructures, little cells that are cemented together. The sub-structures may themselves be crystals or crystalline materials. The properties or characteristics of compressibility, elasticity, the tensile modulus, and the elastic modulus are generally referred to as the bulk properties of the materials, and are all determined by the quantities of the cementation, the qualities of the shapes of those grades of materials, and that is determined by the processing, the fabrication, and the cold working and flowing of the materials. In a highly refined or pure crystalline material, the structural purity is carried over to the molecule to molecule and atom to atom basis. The inter-atomic relationships in such materials is determined by the periodic table, and is evidenced in the covalent or the binding forces between atoms and molecules. For example, pure silicon is an element in the periodic table. Crystals of this material are grown four or six inches in diameter, and up to several feet long. The entirety of the material is essentially one single crystal, which means that the element to element spacing, from silicon atom to silicon atom is the same everywhere. These materials are grown with such perfection that there isn't one atom in $10^{14}$ which is of foreign material. In a volume containing $10^{24}$ atoms, there aren't a thousand that are dislocated or out of place. In other words, these materials are so perfect, that from crystal to crystal, their mechanical or bulk properties are identical to a degree that has never heretofore been achieved in materials. While the external surface of the crystal defines a boundary and, therefore, a discontinuity in the perfect lattice structure of the crystal, the bulk elastic properties are apparent and uniform below the boundary or in the interior region of the crystal.

As suggested above, materials other than nearly perfect crystalline materials may be used and still achieve most of the enumerated objects, with great precision, accuracy and savings in cost. But a resonator in the nature of a steel bar or piece of nickel alloy does not have the above-described nearly perfect atomic structure and, therefore, also does not have the stability of its bulk properties. To the extent that you deviate from the nearly perfect crystal, one begins to lose the precision and the stability of the bulk properties. In the case of nickel alloy, or steel, its precise elastic properties are also determined by the work history. If one stresses these materials, one propagates a lot of defects. Under stress, these defects, screw dislocations, and so on, greatly deteriorate the stability or predictability of the bulk properties. Accordingly, the use of highly imperfect materials in the scheme of the present invention reduces the predictability of the results and, therefore, the precision, accuracy and resolution of the system.

Fluid Pressure Force Measuring System

As suggested above, the advantages of the present invention are achieved by immersing an SMRE 10 in a fluid pressure force bearing fluid medium 12. A suitable form of excitation 14 is used to impart energy to the SMRE in order to excite or activate the SMRE into a resonant mode. As discussed above, the particular form of excitation energy 14 is not critical for the purposes of the present invention, so long as the SMRE can be excited to mechanically oscillate. Numerous forms of excitation including optical, magnetic and the like will be readily evident to those skilled in the art. In each case a suitable resonance frequency determinator 18 is used to translate the information 16 to a form which can be processed in a computing system 20.

Once the SMRE is in its resonant mode, its resonant frequency must be extracted by any suitable means. The form of the information 16 will, clearly, be related to the form of energy excitation used, although the specific form of resonance information, recognition or extraction is similarly not critical. So long as the information can be obtained, by whatever means, meaningful fluid pressure force measurements may be made.

The SMRE, in its resonant mode, essentially defines inherently digital-type information. Herein lies one of the great advantages of the system under discussion, since the essentially pure properties and highly desirable characteristics and the stabilities of the material can be directly translated into digital terms, so that the accuracy and resolution of the system is not compromised the requirement for high accuracy being almost synonymous with digital representation.

Referring to FIG. 1, the resonance information 16 is always in the nature of a mechanical effect frequency, that represents a digital format. Where, therefore, the measuring system is to be entirely in the digital domain, there is no need to convert the resonance information 16 to an analog format. Where, however, this may be desirable, there is provided a resonance frequency determinator 18 which may be used, for example, where computation is to take place in the analog domain. The computing system 20 can, of course, perform the necessary computations by using either digital or analog arithmetic. Where the computations are to use digital techniques, it may merely suffice to properly interface the resonance information 16 to the computing system 20.

The accuracy objective can be thought of as composed of two separate qualities. One relates to the precision or repeatability in resolution of individual measurements, and this, in turn, is related to the stability of the SMRE. The second, is the absolute accuracy or scale deviations from the true values of each measurements. Neither quality implies the other but if resolution or fineness of measure and repeatability are adequate to the objective, then the correct calibration of indication can be supplied by an appropriate correction function. In present electronic technology the use of calculator-like simple microprocessor chips can very easily provide even rather complex multifactor correction functions so readily that the readout appears to be instantaneous. This is possible at such low cost and so little size and power that the method is very attractive. The correction coefficients can be inserted in the device memory by digital means in an automated factory test station itself run by a small computer. This approach is a basic part of providing the low cost in manufacturing parts and systems that afford the stability sought without requiring the accuracy of individual parts. With the technique presently proposed, the accuracy is provided at the completion of manufacture and a final test and calibration. In this way the system benefits from the clear distinction between stability and accuracy.

The question of accuracy in this view then becomes a very different thing from that which so often attends it. In this view, it is not so important how accurate, but how calibratable the system is. Stability and reproducability are the important qualities even though many variables may affect the indications of the system. The method of the present invention is essentially free from tolerances of parts that allows minimization of cost and yet easily can surpass the accuracy of prior art approaches. Stability is the keystone in whatever form the response may come. Large temperature coefficients and high non-linearity of scale can, to the extent that they are stable, be made to disappear in the correction algorithm and calibration of the device.

As noted above, in digital electronic systems, at least in the digital portions of the systems, there is no inherent limit to either the number of the digits that may be used to represent the values of the functions or the number of operations that these numbers may be subject to. In view of this and the principles of the previous paragraphs, it is an important feature of the present invention that the resonance effect is in a digital format at the earliest point in the chain of connection.

The computing system 20, therefore, merely operates on the resonance information to provide an output 22. Where the SMRE can be stabilized by other means, so that temperature and other drift effects can be compensated externally of the SMRE, the computing system 20 can be calibrated to provide a direct output reading when the pressure "P" changes from an ambient value to a value to be measured. As noted above, the change in pressure alters the resonance condition in the SMRE, this being detected and, by suitable computational techniques well known to those skilled in the art, an output is derived which is related to the new pressure value. The output 22 itself, need not be in any special form and may be selected to suit a particular application. As is evident, therefore, the shift in frequency as the result of the fluid pressure force applied to the SMRE results in an analog effect producing a direct digital count shift with no intermediate analog system required.

EXAMPLE 1

Figure 3:
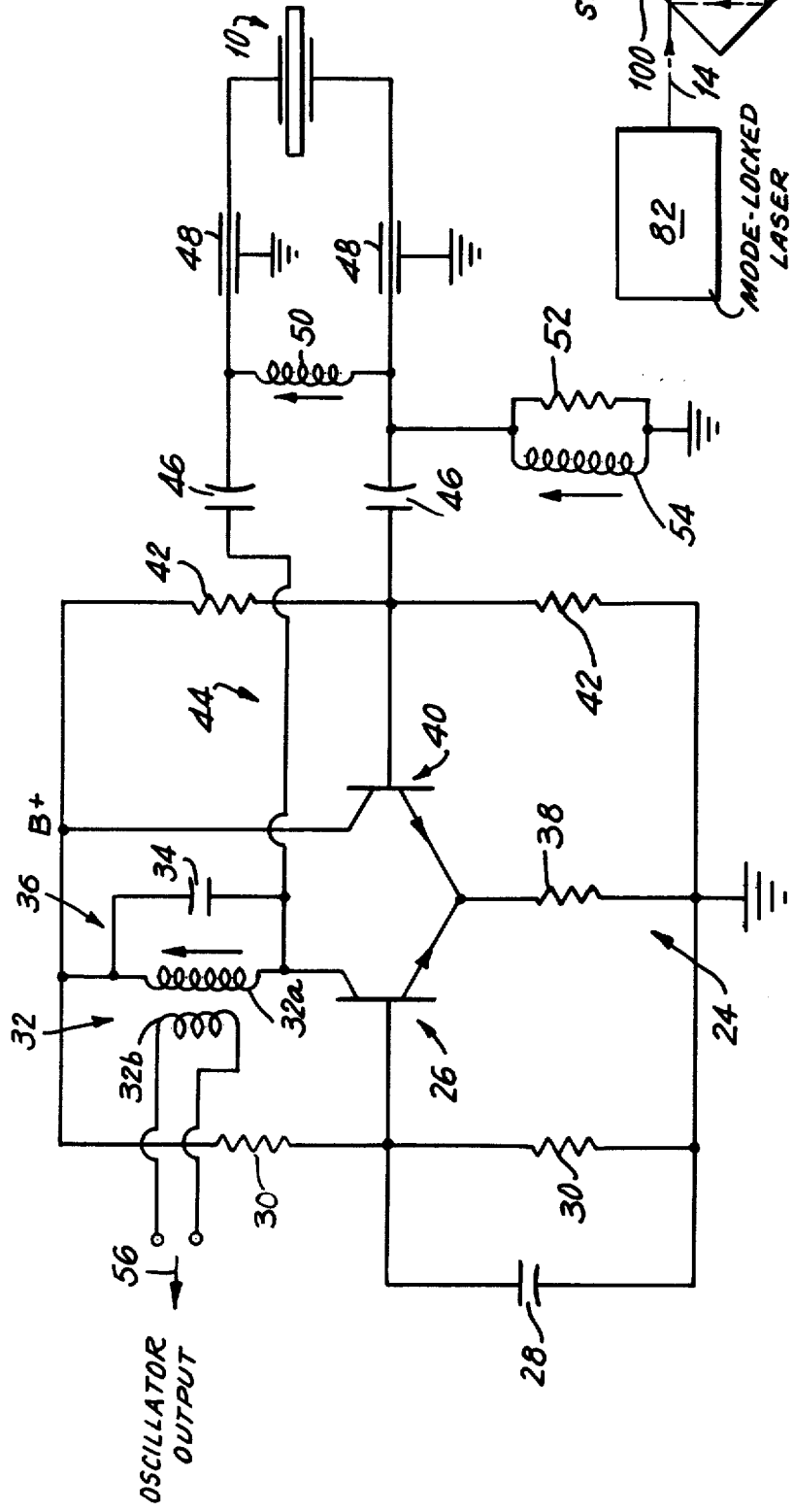
FIG. 3 is an electrical schematic diagram which cooperates with a solid mechanically resonant element in the nature of a quartz crystal for feeding energy therethrough and extracting resonance information therefrom.

Referring to FIGS. 1, and 3-5, there will briefly be described one possible means of utilizing the method of the present invention. Referring first to FIG. 3, there is shown an oscillator circuit which provides the excitation energy and extracts the resonance information from the SMRE 10.

A differential amplifier generally designated by the reference numeral 24 is shown in FIG. 3 which includes a grounded base amplifier transistor 26 having its base grounded through a capacitor 28. The transistor 26 is biased from the B+ supply by means of suitable biasing resistors 30. A transformer 32 is provided, the primary winding 32a of which is placed in the collector of the transistor 26. A capacitor 34 is placed in parallel with the primary winding 32a, these two elements forming a tuned circuit 36 which is tuned approximately to the resonance frequency of the SMRE 10.

A common load resistor 38 is shared by the emitters of the grounded base transistor 26 as well as the emitter follower transistor 40 as shown. The emitter follower 40 is also suitably biased by means of resistors 42.

At the resonant frequency of the SMRE, the tuned circuit 36 exhibits a high impedance and a signal is developed at the collector of the transistor 26 which provides the SMRE excitation 44 which is coupled to the SMRE 10 via DC blocking capacitors 46 and feed-through terminals 48 as shown. The excitation 44 is equivalent to the excitation 14 shown in FIG. 1. In this embodiment, the SMRE 10 is in the nature of a quartz crystal or piezoelectric element. In this embodiment, the excitation and detection means are coupled reciprocally through the SMRE 10. Accordingly, an anti-reciprocal means, namely the amplifier 24, is provided external to the SMRE for sustaining the oscillations thereof.

An inductor 50 is essentially connected in parallel to the SMRE 10 to tune-out the shunt capacitance of the quartz crystal at its series resonance frequency. In this way, the "Q" of the SMRE is significanty higher and the bandwith of the signal is substantially limited and, therefore, more easily detectable.

The grounded base configuration is utilized to provide maximum isolation between the input and the output of the oscillator, while the emitter follower 40 is provided to provide optimum impedance conditions for the SMRE. To this end, a terminating resistance 52 is connected from the base of the emitter follower 40 to ground, and an inductor 54 is connected in parallel with the resistor 52 which tunes out the feed-through terminals 48 as well as other stray capacitances to ground. At resonance, therefore, the SMRE sees the terminating resistance and is properly matched for optimum performance.

Considering FIGS. 1 and 3, the quartz crystal 10 is excited by means of the signal 44, this being equivalent to the excitation energy 14 in FIG. 1, while the resonance information 16 of FIG. 1 is obtained at the secondary winding 32b, this oscillator output containing the resonance information of the SMRE 10 and corresponding to the resonance information 16 in FIG. 1. Accordingly, the oscillator output 56 may be processed by any suitable means, including the computing system 20 shown in FIG. 1.

Figure 4:
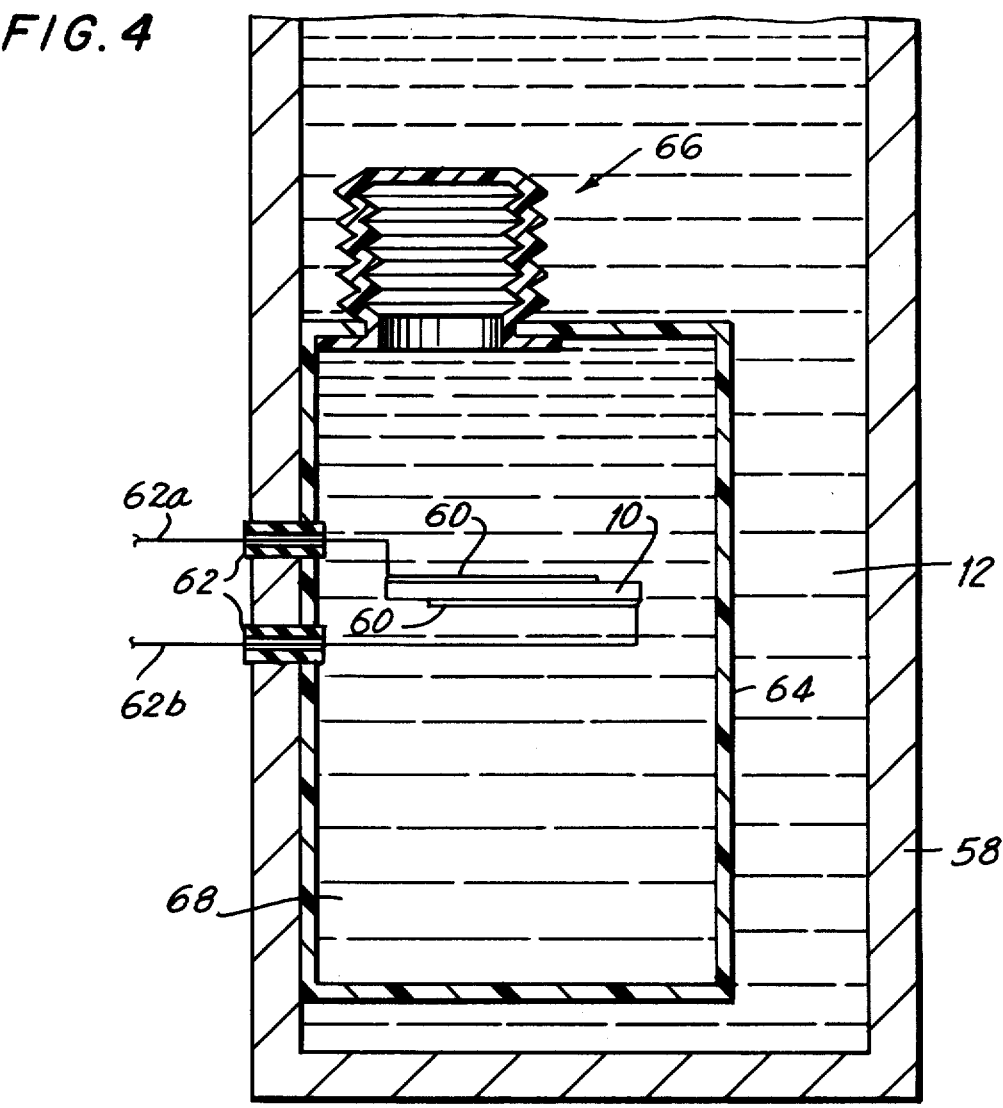
FIG. 4 is an exemplary arrangement, shown in cross-section, of the manner in which the quartz crystal shown in FIG. 3 may be exposed to a fluid pressure force, showing it immersed in a chemically inert fluid in a protective housing, and showing a bellows for permitting the pressure bering fluid to act upon the solid mechanically resonant element without experiencing resistance from the container which houses the same.
Figure 5:
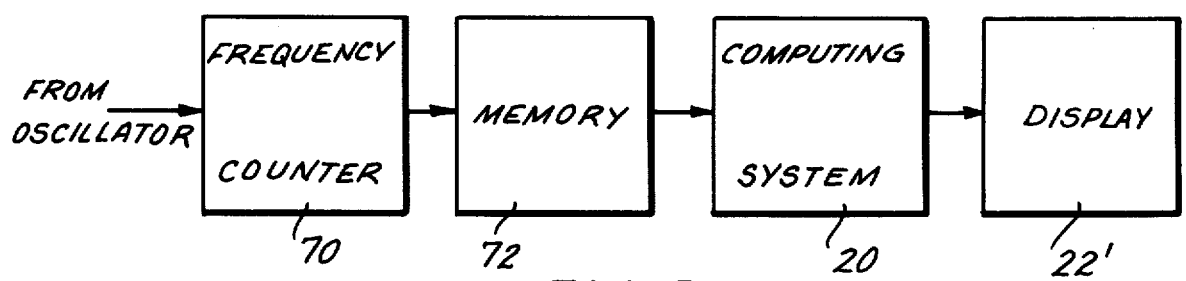
FIG. 5 is a block diagram illustrating the manner in which the output from the oscillator shown in FIG. 3 may be processed to provide a display or output.

In FIG. 4, there is shown schematically a container 58 which houses the pressure bearing fluid 12. The container 58 may form part of a measuring instrument, such as a weighing scale. However, it will be evident to those skilled in the art that the fluid pressure force transducer of the present invention may be utilized to measure fluid pressure forces in any environment. The SMRE 10, which is the quartz crystal as shown in FIG. 3, is provided with a pair of opposing electrodes 60 in the conventional manner, so arranged so as to permit the crystal to vibrate in its thickness mode. Suitable feed-through terminals 62 communicate the interior of an SMRE housing or container 64 and the exterior of the container 58, to accommodate the leads 62a, 62b connected to the SMRE 10.

The SMRE housing 64 is provided to protect the SMRE from chemically active substances. Where the housing 64 is made from a metallic material or other relatively stiff material, such as a typical crystal can, there is advantageously provided a bellows 66 or other suitable means for permitting the internal volume of the housing 64 to vary at least slightly in response to changes in fluid pressure of the surrounding fluid 12. The housing 64 is filled with a chemically inert fluid 68, while the pressure bearing fluid 12 may be hydraulic oil or gas or a possibly more chemically active medium. The purpose of immersing the SMRE in a low chemically active medium is to minimize the extent to which any of the surface conditions are affected by chemical activity. One example of a suitable chemically inert fluid 68 is highly refined silicone oil because its chemical inertness against quartz crystal is very good. The purpose of the bellows 66 is to provide a chamber that has no elastic contribution to the fluid pressure force to be measured. In effect, the SMRE housing, together with the bellows 66, is in the nature of a balloon so that if there is a pressure, the pressure is the same inside the housing 64 as it is outside, the bellows 66 being essentially a zero force type bellows. Without the bellows, clearly, application of a fluid pressure force to the housing 64 would be tantamount to pressing a spring, this modifying the magnitudes of the fluid pressure force seen by the SMRE as well as introducing hysteresis effects from deformations of the can or housing 64. While the fluid 68 has been described as being a liquid, it is evident that such a fluid can also be a chemically inert gas, such as nitrogen or similar gas. The term "fluid" is intended to include both liquids and gases as well as other states as described previously for purposes of the present specification and the appended claims.

Another important feature of the present invention is that the measuring system is not plagued by low differential drifts of the time base reference, since the method easily admits measurements by taking ratios of frequencies as suggested above. By measuring changes in frequency, as the result of changes in the fluid pressure force or pressure "P", and taking a ratio of the measured frequency values, most drifts as well as inaccuracies introduced by the physical size or shape of the SMRE can be eliminated. Clearly, the changes in frequencies can take place in fractions of a second and, therefore, ratios can be continuously taken and an apparently instantaneous output provided. Such computations are easily achieved by logic circuitry that computes the ratios, multiplies the ratios by suitable weighting factors, all well known techniques known to those skilled in the art. Since the resonance information 16 is inherently digital, there is little, if any, accuracy or resolution lost in the measurement process. Differential drifts are the major source of errors as the ratio process corrects for both errors in the absolute values of the reference and the stressed crystal. Changes of hundreds of PPM would not disturb the accurate readings achievable with the present invention. Temperature as well as aging are thus eliminated from the elements of the system. Thus, it is largely the bulk properties that are so invariant that control the response and together with the computation algorithm which provide the highly accurate results.

The correction coefficients for the temperature, force, and any other variables that may depend upon individual device properties are also to be calibrated out in a test station, possibly as a final assembly-line process. As described above, the computation is relatively simple because of the simple ratio of counts and the linearity requires very little more than a ratio minus one times a weight coefficient.

If the stabilities of the crystal and the environmental conditions thereof can be stabilized by other, external means, an arbitrary zero or reference frequency can be utilized for a predetermined fluid pressure or force and, in that case, the computing system 20 can be designed to provide an output 22 upon being provided with a frequency corresponding to the fluid pressure force to be measured.

In view of the above, it should be clear that the absolute frequency at which the SMRE resonates is immaterial. It is the change of frequency with force which is material. One could hypothetically contrive to use two substances, one of which was pure crystalline, and the other was polycrystalline. Both materials could be configured to operate at the same frequency and both of which, to a high order, display the same relative shift of frequency with fluid pressure force. In that instance, the crystalline material still has a high order of superiority because the polycrystalline material cannot have the stability of the bulk properties that the pure crystalline material can display. Since the process of the present invention depends for its accuracy and resolution on the stability of the bulk properties of the material, the method provides the best results when a highly purified single crystalline material is used.

However, because the system relies almost purely on the bulk properties of the materials used, and not on their physical or external shapes or configurations, it is possible to arbitrarily select crystals made of the same material. One crystal, because of its shape, may have a resonance frequency much higher or lower than another crystal. However, with the present method, if all of these crystals are placed into a fluid pressure force bearing fluid, and if they are all made of the same highly stable material, they will function equally well in this system because they have the same bulk properties. By taking the ratios of frequencies occurring on the two separate fluid pressure force conditions, the same ratios result irrespective of the actual resonant frequencies. The computing means can weigh the results with the above-mentioned coefficient, and the same output information is provided, independently of the actual resonant frequencies of each of the individual crystals.

By using the ratio approach, it should be evident that as long as the weighing coefficient K is constant, the output is substantially independent of the size, shape or environmental instabilities. Since K is a function of the stability of the material, the more stable the material is, the more stable or accurate the results.

Given a single type of material crystal, it can be assumed that their bulk properties or coefficients K will be substantially equal and stable. In the computing system 20, as a final calibration, when the entire system is fabricated, a known force and a zero force can be applied to the SMRE. At that point, the ratio is formed and the system can be calibrated to convert the frequency ratio into any suitable output, such as pounds per square inch or other suitable units of fluid pressure force or pressure. If the SMRE is used as a part of a hydraulic weighing system, the weighing device can similarly be calibrated to read in grams, pounds or whatever unit is important.

EXAMPLE II

In the first example, wherein a aquartz crystal SMRE was used with electrodes as part of an electrical oscillator circuit, the exciting means 14 and the detecting means 16 of FIG. 1 are coupled reciprocally through the SMRE. Referring to FIGS. 6 and 7, there is shown an exemplary arrangement wherein the exciting means 14 and the detecting means 16 are coupled anti-reciprocally through the SMRE 10 for sustaining the oscillation thereof at the resonant frequency. In FIG. 6, there is shown a similar arrangement as in FIG. 4, wherein the SMRE 10 is housed within an SMRE housing or container 64 which is provided with a bellows 66, the housing itself being immersed in a pressure bearing fluid 12. The SMRE 10 is immersed in the chemically inert fluid 68 as above-described. In this arrangement, the container 58 is provided with a transparent window 74 and the SMRE housing is provided with a transparent window 76 as shown. The housings 58 and 64 are also provided with aligned transparent windows 78 and 80 as shown. With such as arrangement, excitation energy in the form of a beam of radiation 14 can be directed at the SMRE 10, even from a remote location. The SMRE is placed into a resonant mode of mechanical oscillation as described in connection with FIG. 1. The actual resonance frequency is extracted in a suitable manner, such as a beam of radiation 16 which is transmitted through the transparent windows 78, 80 to a suitable detecting means. The affected leakage radiation 16 contains the information as to the resonance frequency of the SMRE and, therefore, can be used to make the computation to arrive at the fluid pressure force to which the SMRE 10 is exposed.

In FIG. 7, there is schematically illustrated but one possible arrangement which can be utilized to excite the SMRE 10, place the same into a self-sustaining mode of resonance, and to extract the resonance information therefrom. A mode-locked laser 82 is shown to include a laser 84, a pair of brewster windows 86 and an etalon 88 as shown. The purpose of mode-locking the laser 84 is to create a highly coherent, noise-free single frequency laser output that can be better modulated by the magnitude of the frequency of the mechanical resonator. A modulator 90 is provided in the excitation path to modulate the excitation energy with an observable resonance effect by a photodetector 92 which converts the leakage energy or resonance information 16 into a signal suitable for modulating the modulator 90. The modulator 90 and the photodetector 92 provide a method of getting the information back and imposing it upon the incident energy 14 to excite the SMRE 10 to resonance. In this system, the resonance of the SMRE is sustained by coupling means at least partially external of the SMRE.

Optional polarizers 94 and 96 are provided in the path of the excitation energy 14 and the path of resonance information extraction 16 as shown. These are used to improve the signal to noise ratio by suppressing the carrier and any of its noise sidebands and pick up only the modulation. Since the light from the mode-locked laser 82 is polarized, the polarizers 94, 96 could be used to adjust the amplitude of the output or its polarization angle to substantially null the steady state condition and allow only the sideband energy to pass through.

The affected energy containing the resonance information 16, after detection by the photodetector 92, is fed to an electronic driver 98, which in this embodiment, is shown to modulate the modulator 90, as well as provide a suitable signal to the computing system.

When exciting an SMRE by a beam of radiation as aforementioned, the beam of radiation is modulated at a frequency substantially corresponding to the resonance frequency of the SMRE. By feeding back detected information corresponding to the resonance frequency of the SMRE to the modulator 90, the resonance in the SMRE is thereby sustained.

While a photodetector 92 has been described as detecting the resonance information, it should be evident to those skilled in the art that any other suitable means for detecting the mechanical oscillation of the SMRE may be utilized. Such information may, for example, be detected by electromagnetic or other means.

One of the several advantages which the approach exemplified in FIGS. 6 and 7 provides is that, in addition to offering remote excitation and information retrieval possibilities, the SMRE resonance may be established internally of the surface boundaries of the SMRE. As described above, exciting and detecting the resonance in a region of the material removed from the boundaries provides a still more idealized result, since, in that instant, the stability of the material is used at its optimum value.

EXAMPLE III

Described in connection with FIGS. 6 and 7 was one arrangement or scheme to get a concentration of energy that is easily modulatable, that is coherent enough to get the information off, and so on. A variant of that approach is illustrated schematically in FIG. 8, wherein an arrangement is shown wherein the oscillation is sustained by coupling means contained entirely within the SMRE 10. With this approach, the exciting source 14 directs a beam of radiation at the SMRE. A mode-locked laser 82 may be used for this purpose. The SMRE 10 is configured to trap the beam of radiation so as to produce a sustained mechanical oscillation therein and to leak only a small portion thereof sufficient for detection by the photodetector 92. Here, the SMRE is advantageously provided with a polygonal refractive path in a plane parallel to the direction of transmission of the beam of radiation 14. The surfaces 100 defining said polygonal path may be reflective or refractive boundaries and are arranged to cause the beam of radiation or coherent light to be substantially internally reflected within the SMRE. The internal reflection and the energy trapping is illustrated by the arrows 102. This produces a recursive, anti-reciprocal arrangement which is self-modulating and, therefore, dispenses with the need for external modulators or anti-reciprocal elements.

While a substantial portion of the energy is trapped within the SMRE 10, there is some leakage of radiation 16 which, contains the resonance information, and as with the previously described example may be picked up by a suitable photodetector 92 and then fed to a computing system.

Figure 8:
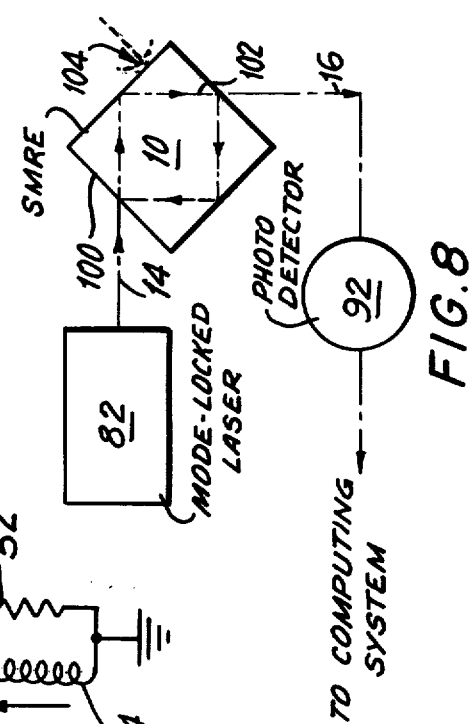
FIG. 8 is a simplified block diagram generally similar to FIG. 7, but showing a solid mechanically resonator optically pumped with energy, but which is self-modulating by providing the same with reflective or refractive boundaries.

Since the mode-locked laser emits a beam of radiation generally optical in nature, there will also result an optical radiation leakage 16 which may be picked up by the photodetector 92. However, as above-mentioned, the SMRE 10 will, at resonance, vibrate or oscillate mechanically and such mechanical oscillations can be picked up by any other suitable means, including magnetic or electric, among others. In FIG. 8, there is also shown in dashed outline a capacitive pick-up 104 which may be positioned proximate to a surface of the SMRE to sense the mechanical vibrations thereof.

Particularly with the embodiments described in Examples II and III, numerous applications will come to mind to those skilled in the art. Because of the ability of such systems to remotely excite and extract information from the SMRE, the systems are suitable, for example, in microphone arrays, and very high pressure hostile environment pressure transducers. The "cube" 10 in FIG. 8 may be arranged to form a microphone array suspended in air, this also being a fluid pressure environment whose pressure is modified by pressure patterns characteristic of sound. Such "cubes" could act as microphones with utterly no connections apparent to or from them. Each of the cubes or SMRE's 10 could be excited by suitable optical means, such as a laser, the leakage information being scattered radiation which may be invisible to the observer but nevertheless detectable.

It is to be understood that the foregoing description of the various embodiments illustrated herein is exemplary and various modifications to the embodiments shown herein may be made without departing from the spirit and scope of the invention.

What is claimed is:

1. A fluid pressure force measuring system comprising a solid mechanically resonant element immersed in a pressure bearing medium and whose frequency is affected by the value of the fluid pressure force to be measured and whose relative change in frequency with changes in fluid pressure force is primarily dependent on the bulk properties of said solid mechanically resonant element; exciting means for exciting said solid mechanically resonant element; and detecting means for determining, at a fluid pressure force to be mesured, the value of a measurable resonant frequency of said solid mechanically resonant element and forming a ratio between a signal corresponding to said measurable resonant frequency and a reference signal, for determining the value of the fluid pressure force therefrom.

2. A measuring system as defined in claim 1, wherein said detecting means comprises means for forming a ratio of frequency values corresponding to differing fluid pressure force conditions.

3. A fluid pressure force measuring system as defined in claim 1, wherein said solid mechanically resonant element comprises a crystalline material.

4. A fluid pressure force measuring system as defined in claim 3, wherein said crystalline material is a polycrystalline material.

5. A fluid pressure force measuring system as defined in claim 3, wherein said crystalline material is a highly perfect single-crystal material.

6. A fluid pressure force measuring system as defined in claim 1, wherein said solid mechanically resonant element comprises an amorphous glassy material.

7. A fluid pressure force measuring system as defined in claim 1, wherein said solid mechanically resonant element comprises a super cooled fluid in a glassy state.

8. A fluid pressure force measuring system as defined in claim 1, further comprising closed container means for enclosing said solid mechanically resonant element, container means having at least one wall portion which is resilient to permit changes in volume in said container means upon application of forces on said at least one wall portion, container fluid means comprising a first pressure bearing medium filling said container means, said solid mechanically resonant element being immersed in said container fluid means, whereby exposing said at least one resilient wall portion to a change in the forces applied to said container means by a second pressure bearing medium is manifested as a change in fluid pressure which said container fluid means applies to said solid mechanically resonant element, whereby said container means prevents an incompatible medium from affecting said solid mechanically resonant element.

9. A fluid pressure force measuring system as defined in claim 8, wherein said container fluid means or first pressure bearing medium comprises a chemically inert medium.

10. A fluid pressure force measuring system as defined in claim 9, wherein said chemically inert medium comprises refined silicone oil.

11. A fluid pressure force measuring system as defined in claim 1, wherein said exciting means and detecting means are coupled reciprocally through said solid mechanically resonant element, and further comprising anti-reciprocal effect coupling means external to said solid mechanically resonant element for sustaining the oscillations thereof at said resonant frequency.

12. A fluid pressure force measuring system as defined in claim 1, wherein said exciting means and detecting means are coupled anti-reciprocally through said solid mechanically resonant element for sustaining the oscillation thereof at said resonant frequency.

13. A fluid pressure force measuring system as defined in claim 12, wherein said oscillation is sustained by coupling means contained entirely within said solid mechanically resonant element.

14. A fluid pressure force measuring system as defined in claim 12, wherein said oscillation is sustained by coupling means at least partially external of said solid mechanically resonant element.

15. A fluid pressure force measuring system as defined in claim 11, wherein said solid mechanically resonant element comprises a piezoelectric material, and wherein said antireciprocal effect coupling means comprises external amplifying means.

16. A fluid pressure force measuring system as defined in claim 14, wherein said exciting means comprises means for directing at said solid mechanically resonant element a modulated beam of radiation having a modulation frequency substantially corresponding to the resonant frequency and the harmonics of said solid mechanically resonant element, and said detecting means comprises a detector cooperating with said exciting means to sustain the oscillation of said solid mechanically resonant element.

17. A fluid pressure force measuring system as defined in claim 13, wherein said exciting means comprises means for directing at said solid mechanically resonant element a beam of radiation, said solid mechanically resonant element being configured to trap said beam of radiation so as to produce a sustained mechanical oscillation in said solid mechanically resonant element and to leak only a small portion thereof, said detecting means operating on said small portion of leaked radiation.

18. A fluid pressure force measuring system as defined in claim 17, wherein said solid mechanically resonant element has a polygonal refractive path in a plane parallel to the direction of transmission of said beam of radiation, the surfaces defining said polygonal path being arranged to cause said beam of coherent light to be substantially internally reflected within said solid mechanically resonant element.

19. A method of measuring fluid pressure force comprising the steps of immersing a solid mechanically resonant element into a fluid pressure bearing medium; exciting the solid mechanically resonant element to resonante at a measurable frequency, frequency changes with changes in fluid pressure force being primarily dependent upon the bulk properties of said solid mechanically resonant element; and detecting said measurable frequency, said detecting step including forming a ratio between a signal corresponding to said measurable frequency and a reference signal.

20. A method of measuring fluid pressure force as defined in claim 19, further comprising the step of taking the ratio of at least two frequencies corresponding to differing fluid pressure force conditions.

* * * * *

UNITED STATES PATENT OFFICE
CERTIFICATE OF CORRECTION

PATENT NO. : 4,126,049
DATED : November 21, 1978
INVENTOR(S) : Mitchell A. Cotter It is certified that error appears in the above-identified patent and that said Letters Patent are hereby corrected as shown below:

[73] Assignee: General Resistance, Inc.
Mount Vernon, New York 10553

Signed and Sealed this

Third Day of April 1979

[SEAL]

Attest:

RUTH C. MASON
Attesting Officer

DONALD W. BANNER
Commissioner of Patents and Trademarks